United States Patent
Baumann et al.

(10) Patent No.: US 6,751,377 B2
(45) Date of Patent: Jun. 15, 2004

(54) MICROMECHANICALLY ACTIVE RECONFIGURABLE ADD-DROP FILTERS

(75) Inventors: Frieder Heinrich Baumann, Red Bank, NJ (US); Mihaela Dinu, Eatontown, NJ (US); Howard Roy Stuart, Red Bank, NJ (US); James Albert Walker, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 235 days.

(21) Appl. No.: 09/861,840

(22) Filed: May 21, 2001

(65) Prior Publication Data

US 2002/0172466 A1 Nov. 21, 2002

(51) Int. Cl.[7] .................................................. G02B 6/42
(52) U.S. Cl. ............................................ 385/32; 385/15
(58) Field of Search ............................... 385/15, 24, 31, 385/32

(56) References Cited

U.S. PATENT DOCUMENTS 5,905,573 A * 5/1999 Stallard et al. ............. 356/519
6,195,187 B1 * 2/2001 Soref et al. ................. 359/114
6,473,541 B1 * 10/2002 Ho ............................. 385/15

OTHER PUBLICATIONS

Hagness, et al., "FDTD Microcavity Simulations: Design and Experimental Realization of Waveguide–Coupled Single–Mode Ring and Whispering–Gallery–Mode Disk Resonators", Journal of Lightwave Technology, vol. 15, No. 11, Nov. 1997.
DeLong, K.W. et al, "Effect of two–photon absorption on all–optical guided–wave devices", Appl. Phys. Lett. 55(18), Oct. 30, 1989.
Madsen, Christi K. and Zhao, Jian H., "Optical Filter Design and Analysis", Wiley–Interscience Publication, John Wiley & Sons, Inc., pp. 68–77 New York, 1999.
Blair, Steve, et al., "Beyond the absorption–limited nonlinear phase shift with microring resonators", Optical Society of America, Optics Letters, vol. 27, No. 5, Mar. 1, 2002.

* cited by examiner

Primary Examiner—Michael P. Stafira
Assistant Examiner—Juan D Valentin II

(57) ABSTRACT

In accordance with the invention, a tunable, reconfigurable optical add-drop filter comprises a pair of optical waveguides optically coupled by a microring or microdisk resonator wherein the coupling distance between the resonator and at least one of the waveguides is micromechanically controllable. With this arrangement, the degree of coupling can be tuned after fabrication to provide high level extinction of dropped wavelengths and the filter can be dynamically reconfigured. Advantageously, laser radiation is provided to tune the resonant wavelength.

6 Claims, 2 Drawing Sheets

MICROMECHANICALLY ACTIVE RECONFIGURABLE ADD-DROP FILTERS

FIELD OF THE INVENTION

This invention relates to optical add-drop filters and, in particular, to micromechanically active, reconfigurable add-drop filters.

BACKGROUND OF THE INVENTION

Optical communication systems are beginning to achieve their great potential for the rapid transmission of vast amounts of information. In essence, an optical communication system comprises a source of light, a modulator for impressing information on the light to produce optical signals, an optical fiber transmission line for carrying the optical signals and a receiver for detecting the signals and demodulating the information they carry. Increasingly the optical signals are wavelength division multiplexed signals (WDM signals) comprising a plurality of distinct wavelength signal channels.

Add/drop devices are important components of WDM optical communication systems. Such devices are typically disposed at various intermediate points along the transmission fiber (called nodes) to permit adding or dropping of signal channels at the nodes. Thus, for illustration, an add/drop device would permit a transmission line from New York to Los Angeles to drop off at Chicago signal channels intended for Chicago and to add at Chicago signal channels for New York and Los Angeles. As the number of nodes increases, the number of add/drop devices increases, and their cost and effect on the system become appreciable.

FIG. 1 schematically illustrates a conventional optical add-drop filter 10 known as a microring add-drop filter. The filter 10 comprises, in essence, a pair of optical waveguides 11 and 12 optically coupled by a microscale resonator 13 comprising a waveguide ring closely adjacent each of the wave guides 11, 12. The ring 13 is optically resonant for optical wavelengths $\lambda_i$ such that $n\lambda_i = C$, where C is the circumference of the ring and n is an integer.

In operation, if a set of wavelengths $\lambda_1, \lambda_2, \ldots \lambda_N$ is incident on input port I of waveguide 11, any of the wavelengths resonant with the microring resonator will couple across the resonator 13 to waveguide 12 and exit the filter 10 at drop port R. Nonresonant wavelengths will pass the ring structure unperturbed and exit the filter 10 at the through port T. In addition, resonant wavelengths can be added at the add port A and will exit at port T.

The diameter D of the ring is chosen sufficiently small to obtain a desired free spectral range. To obtain a free spectral range of the order of tens of nanometers, D must be less than about 10 micrometers. With such small diameters, the index contrast between the ring and its cladding (the lateral index contrast) must be high to avoid bending losses. Typically, the rings are fabricated with air cladding in the lateral direction.

In view of the high lateral index contrast, the coupling distances $d_1$ and $d_2$ between the ring 13 and waveguides 11, 12, respectfully, must be small—typically less than 300 nanometers in order to obtain the necessary coupling. In alternative embodiments, the microring resonator 13 can be replaced by a microdisk resonating in whispering gallery modes. Further details concerning the structure and operation of conventional microring and microdisk add-drop filters are set forth in B. E. Little, et al, "Microring Resonator Channel Dropping Filters", 15 *Journal of Lightwave Technology* 998 (1997); B. E. Little, et al., "Ultracompact Si—SiO$_2$ Microring Resonator Optical Channel Dropping Filters, 10 *IEEE Photonics Technology Letters* 549 (1998); and D. Radfizadeh, et al., "Wave-Guide-Coupled AlGaAs/GaAs Microcavity Ring and Disk Resonators . . . ", 22 *Optics Letters* 1244 (1997), each of which is incorporated herein by reference.

While theoretically promising, microring and microdisk add-drop filters are difficult to fabricate with necessary precision. For example, a good quality add-drop filter must essentially eliminate a dropped wavelength so that it does not reach the port T. (The filter must achieve a high extinction ratio for the dropped wavelength.) This elimination requires precise control of the coupling distances $d_1$, $d_2$. But due to their small sizes (less than 300 nm), these distances are difficult to fabricate with the necessary precision. Published results to date have shown only slightly better than 10 dB extinction for the best individual devices.

Another challenge in fabrication is to make microrings or microdisks with precise resonant frequencies. An add-drop filter for telecommunications would need rings or disks with diameters specified and fabricated to better than 1 part in 1500 in order to overlap a dense WDM grid (100 GHz spacing). Moreover, sidewall roughness of the ring adds a further degree of uncertainty to the precise value of the diameter.

Finally it should be noted that the conventional microring and microdisk add-drop filters are fixed in configuration. Once fabricated, the filter will always add and drop the same respective wavelengths. However, in contemplated systems it would be highly advantageous if add-drop filters could be dynamically reconfigured to select and change which wavelength channels are added and dropped.

SUMMARY OF THE INVENTION

In accordance with the invention, a tunable, reconfigurable optical add-drop filter comprises a pair of optical waveguides optically coupled by a microring or microdisk resonator wherein the coupling distance between the resonator and at least one of the waveguides is micromechanically controllable. With this arrangement, the degree of coupling can be tuned after fabrication to provide high level extinction of dropped wavelengths and the filter can be dynamically reconfigured. Advantageously, laser radiation is provided to tune the resonant wavelength.

BRIEF DESCRIPTION OF THE DRAWINGS

The advantages, nature and various additional features of the invention will appear more fully upon consideration of the illustrative embodiments now to be described in connection with the accompanying drawings. In the drawings.

It is to be understood that these drawings are for purposes of illustrating the concepts of the invention and are not to scale.

DETAILED DESCRIPTION

Figure 1:
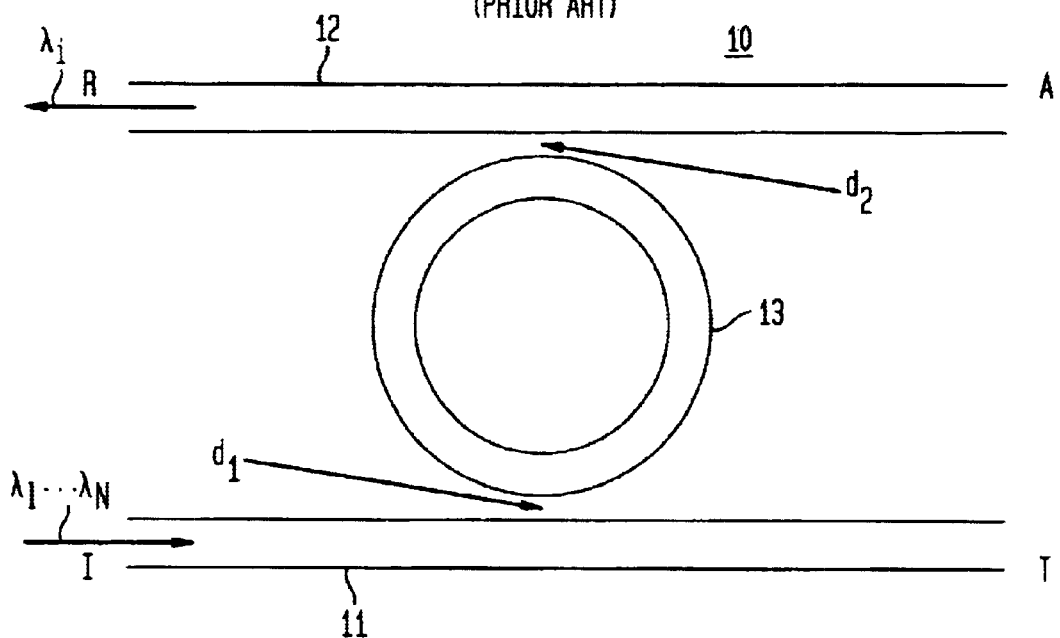
FIG. 1 schematically illustrates a conventional optical add-drop filter.

Referring to the drawing, FIG. 1 illustrates a conventional add-drop filter and was described in the Background of the Invention hereinabove.

Figure 2:
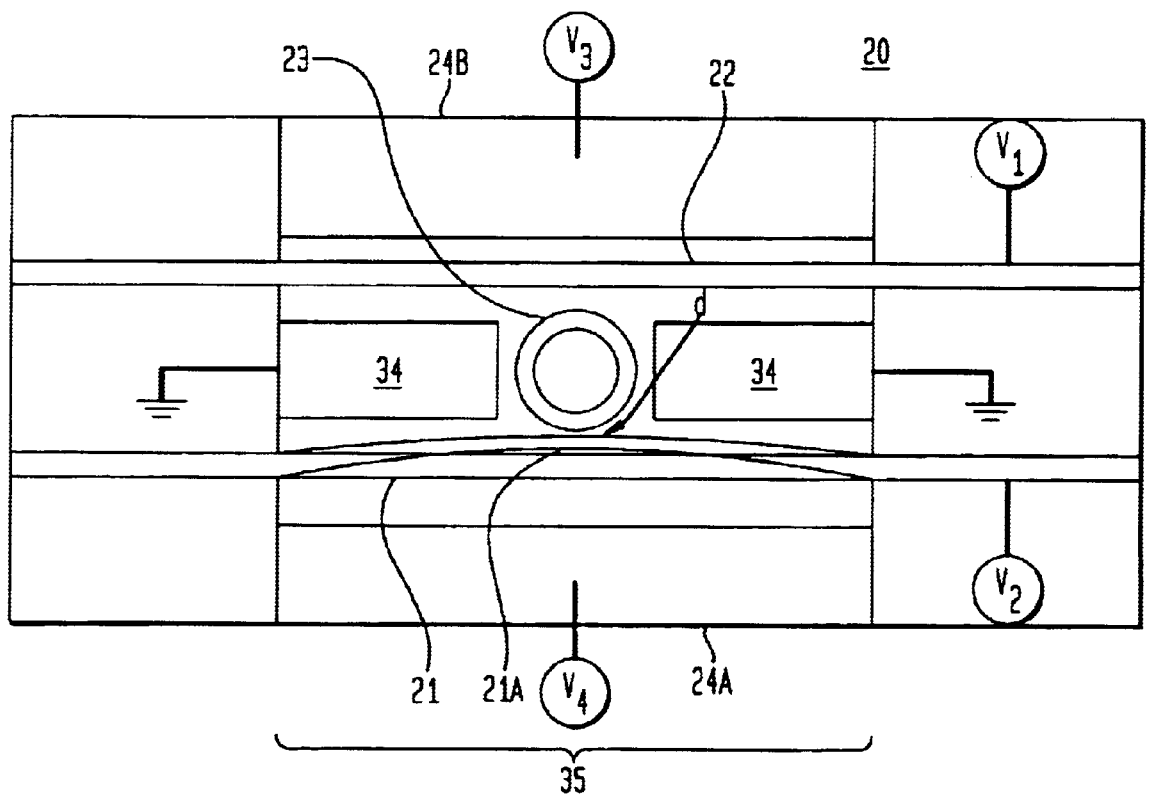
FIG. 2 is a schematic top view of an exemplary tunable, reconfigurable optical add-drop filter in accordance with the invention.

FIG. 2 is a schematic top view of a tunable, reconfigurable optical add-drop filter 20 comprising a pair of locally non-intersecting optical waveguides 21, 22 having an optical resonator 23 (here a microring resonator) disposed between them. At least one of the waveguides e.g. 21 is micromechanically movable toward or away from the resonator 23 to control the optical coupling distance d, between the waveguide and the resonator 23. One or more actuating electrodes 24A, 24B can be provided to move the waveguides 21, 22 toward or away from the resonator 23.

Figure 3:
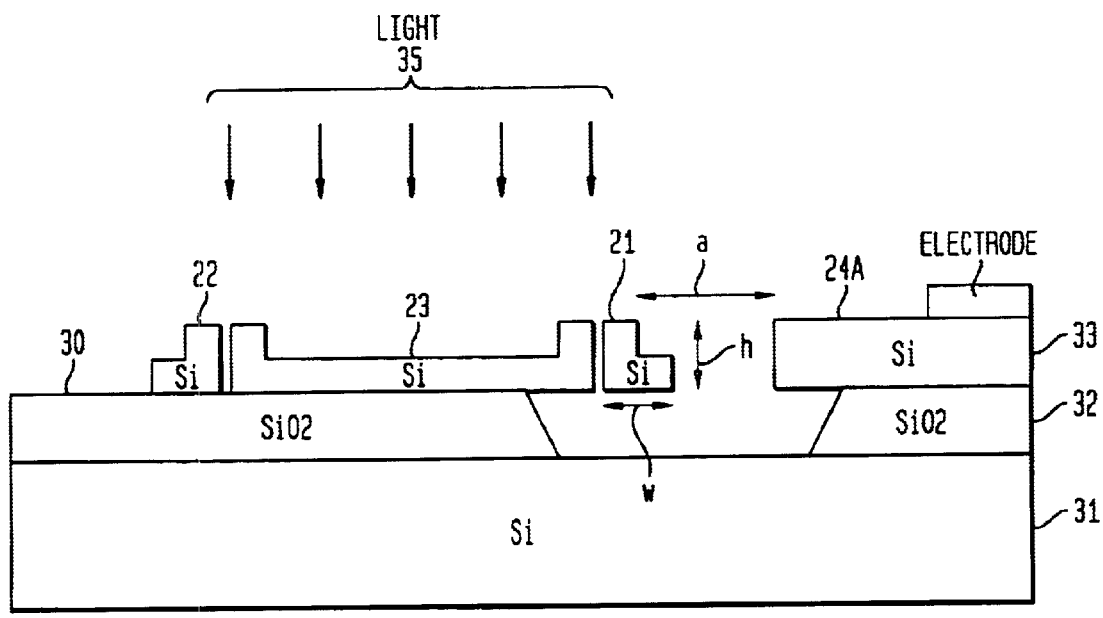
FIG. 3 is a schematic cross section of the filter of FIG. 2.

FIG. 3 is a schematic cross section of the filter of FIG. 2. The waveguide 21, the resonator 23 and the waveguide 22 are advantageously low-loss rib waveguides (single mode or multimode). They can be conveniently formed on a silicon-on-insulator workpiece 30 comprising a base layer 31 of silicon, a middle insulating layer 32 comprising several micrometers of $SiO_2$ and a top layer 33 comprising several micrometers of single crystal silicon. The waveguides, resonator and actuating electrodes are preferably formed in the top layer 33 using techniques well known in the art. The top silicon layer 33 possesses good mechanical properties, and the underlying oxide layer 32 can function as a sacrificial layer for releasing the mechanically active region. See, for example, R. A. Soref, et al., "Large single-mode rib waveguides in GeSi—Si and Si-on-$SiO_2$," 27 *IEEE J. Quant. Elec.* 1971 (1991) and B. Jalali, et al., "Guided-Wave Optics In Silicon-on-Insulator Technology," 143 *IEE Proceedings-Optoelectronics* 307 (1996), which are incorporated herein by reference.

The device can be fabricated with the initial waveguide-resonator spacing $d_o$ at a larger value than the spacing required for coupling (e.g. $d_o$=0.5 micrometer). In this manner, the device can be made using optical lithography with relatively loose tolerances on the precise value of $d_o$. Referring back to FIG. 2, the central strips of silicon 34 surrounding the resonator 23 are electrically grounded, and different voltages ($V_1$ and $V_2$) can be applied to the two waveguides, drawing them towards the resonator. Waveguide 21 in a position drawn toward the resonator is shown as 21A. The coupling can be adjusted independently for the two waveguides 21, 22, permitting optimization of throughput extinction. In addition, separate voltages ($V_3$ and $V_4$) can be applied to the outlying electrodes 24A and 24B to pull the waveguides away from the resonator and completely shut off the coupling.

The precise shape and dimensions of the waveguides and the ring will depend upon the optical and mechanical design constraints. The relative shapes and aspect ratios shown in FIG. 2 are merely illustrative and do not necessarily reflect what the final device would look like. The dimensions of the top two layers will be on the order of one to several microns, and the spacing between the waveguide and the ring will be less than about 300 nm. The optical constraint is that the distance a should be large enough to allow for "shutting off" the interaction. Motion is obtained by electrostatic actuation: the waveguide 21 can be electrically grounded (at a point adjacent to the mechanically active region) and a voltage is applied to the Si layer pictured to the right of the released waveguide. The waveguide will move away from the resonator. For lower drive voltages, smaller w, larger h, and smaller a are preferred. The mechanically active region 35 will extend beyond the waveguide-resonator interaction region by ten to several tens of microns to allow for a wide bending length. Outside this region the waveguide will be anchored on the $SiO_2$ underlayer 32. Adiabatic tapering can be used to modify the waveguide parameters and to allow for good coupling to an optical fiber.

Advantageously radiation 36 from a laser (not shown) can be shone selectively on the ring resonator 23 to tune the resonant wavelength. The radiation provides tuning by increasing the temperature of the resonator and increasing the density of charge carriers in the resonator. The wavelength of the radiation is preferably less than 1 micrometer and typically 0.85 micrometer.

To illustrate the feasibility of this design, one can calculate the voltage required to move the waveguide. For simplicity, consider a waveguide with a rectangular cross-section, and assume w=1 micron and h=3 microns. Also assume the length l of the mechanically released section of the waveguide to be l=40 microns. The displacement δ of a beam of length l anchored on both ends can be written:

$$\delta = \frac{5ql^4}{384 EI}$$

where q is the force per unit length applied to the beam (the force is uniform across the whole beam), I is the moment of inertia of the beam cross-section, and E is Young's modulus. The force per unit length generated on the beam by applying a voltage V can be written:

$$q = \frac{\varepsilon_o h V^2}{2d^2}$$

where $\varepsilon_o$ is the premitivity of free space, and d is the separation between the two surfaces defining the capacitor. Assuming an initial (as fabricated) separation a=1 micron, and calculating the voltage required to displace the beam by 0.5 micron, we arrive at a value of V=57.6 volts. Current MEMs devices routinely operate at tens of volts, so this value is feasible. The L-shaped waveguide pictured in the diagram above will have a larger moment of inertia than was assumed for this calculation, but the larger moment can be compensated by increasing the length l of the mechanically released section.

Figure 4:
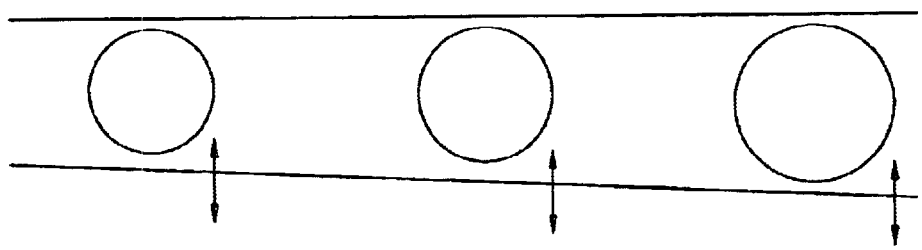
FIG. 4 is a schematic top view of a multi-wavelength reconfigurable add-drop filter.

FIG. 4 is a schematic top view of a multi-wavelength reconfigurable add-drop filter 40 formed by cascading a plurality of tunable, reconfigurable add-drop filters 20A, 20B, 20C, with resonator stages independently addressable actuating electrodes (not shown for simplicity of stimulation). As many wavelengths as desired can thus be added or dropped.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed:

1. A reconfigurable optical add-drop filter comprising:
   first and second optical waveguides;
   a ring or disk optical resonator for optically coupling together the first and second waveguides, the resonator disposed adjacent each waveguide; and
   an electrode adjacent at least one of the waveguides for electrostatically moving the waveguide toward or away from the resonator, thereby controlling the optical coupling between the waveguide and the resonator.

2. The reconfigurable optical add-drop filter of claim 1 including one or more electrodes adjacent each waveguide for electrostatically moving the waveguide toward or away from the resonator.

3. The reconfigurable optical add-drop filter of claim 1 further comprising a laser for applying radiation to the resonator to tune the frequency of optical resonance.

4. The reconfigurable optical add-drop filter of claim 1 comprising a plurality of optical resonators for optically coupling together the first and second waveguides and, for each resonator, one or more electrodes adjacent at least one of the waveguides for electrostatically moving the waveguide toward or away from the resonator.

5. The reconfigurable optical add-drop filter of claim 1 wherein the first and second waveguides comprise rib optical waveguides.

6. The reconfigurable optical add-drop filter of claim 1 wherein the optical resonator comprises a ring of rib optical waveguide.

* * * * *